(12) United States Patent
Adams

(10) Patent No.: US 7,552,734 B2
(45) Date of Patent: Jun. 30, 2009

(54) WEARABLE DRINKING CONTAINER (HANDS FREE ) X SHAPE

(76) Inventor: Shawn Maurice Adams, 106 Lake Ave. # 2, Yonkers, NY (US) 10703

( * ) Notice: Subject to any disclaimer, the term of this patent is extended or adjusted under 35 U.S.C. 154(b) by 618 days.

(21) Appl. No.: 11/114,764

(22) Filed: Jul. 14, 2005

(65) Prior Publication Data

US 2007/0012732 A1 Jan. 18, 2007

(51) Int. Cl.
*A45F 3/04* (2006.01)
*A45F 3/14* (2006.01)
*A45F 3/16* (2006.01)
*A45F 3/20* (2006.01)

(52) U.S. Cl. .................. 128/847; 224/148.1; 224/148.2; 224/148.5; 224/148.6; 222/175; 450/38

(58) Field of Classification Search ............ 128/200.24, 128/201.11, 201.27, 201.28, 201.29, 202.15, 128/202.19, 202.27, 912, 95.1, 847, 856, 128/869, 200.14; 2/114, 102; 601/15–17, 601/148, 151, 152; 607/104; 403/396; 441/106, 441/108, 113–119; 285/130.1; 222/175; 224/148.1–148.6; 450/38

See application file for complete search history.

(56) References Cited

U.S. PATENT DOCUMENTS

| 693,795 | A | * | 2/1902 | Giersberg | 128/205.12 |
|---|---|---|---|---|---|
| 3,049,736 | A | * | 8/1962 | Toulmin, Jr. | 441/113 |
| 3,675,244 | A | * | 7/1972 | Mayo et al. | 2/2.16 |
| 3,738,367 | A | * | 6/1973 | Hardy | 607/104 |
| 4,139,130 | A | | 2/1979 | Glusker et al. | |
| 4,265,381 | A | * | 5/1981 | Muscatell | 224/148.5 |
| 4,526,298 | A | * | 7/1985 | Boxer et al. | 222/130 |
| 4,948,023 | A | * | 8/1990 | Tripp | 224/148.2 |
| 5,060,833 | A | | 10/1991 | Edison et al. | |
| 5,085,349 | A | | 2/1992 | Fawcett | |
| 5,125,864 | A | * | 6/1992 | Roberson et al. | 446/268 |
| 5,203,325 | A | * | 4/1993 | Carr | 128/202.26 |
| 5,353,793 | A | * | 10/1994 | Bornn | 600/386 |
| 5,400,934 | A | * | 3/1995 | Ducros | 224/148.2 |

(Continued)

FOREIGN PATENT DOCUMENTS

EP 0062028 A2 10/1982

(Continued)

*Primary Examiner*—Justine R Yu
*Assistant Examiner*—Clinton Ostrup
(74) *Attorney, Agent, or Firm*—Phillip E. Decker; Mesmer & Deleault, PLLC

(57) ABSTRACT

Wearable Drinking Garment is a series of inner skeletal tubes lined together and attached to form an X that straps flat around the chest, back and under arm area, with sipping tube at top end and airflow stub tube at bottom end; covered and protected by inner insulated lining to lock in temperature of water/liquid in extreme weather conditions; outer mesh lining for heavy resistance against rough and extreme activities. These three together form the X-shape Vest that locks onto the body, can go under or over clothing, is hands free and lightweight with water flowing through a series of flat tubes, giving an evenly balanced comfortable glove-tight fit to the body, with easy slip on/off convenience. Compete at higher levels while never stopping to get a drink. Second generation has oxygen tubes, mini tank for better breathing, ie: medical purposes, diving, space travel, short/long term mining and more.

20 Claims, 11 Drawing Sheets

U.S. PATENT DOCUMENTS

| | | |
|---|---|---|
| 5,427,290 A | 6/1995 | Thatcher |
| 5,529,061 A * | 6/1996 | Sanders .................. 128/205.22 |
| 5,622,293 A * | 4/1997 | LeFevre .................. 224/148.2 |
| 5,732,860 A * | 3/1998 | Faraj ...................... 224/148.2 |
| 5,864,880 A | 2/1999 | Adam |
| 5,911,406 A * | 6/1999 | Winefordner et al. ....... 251/339 |
| 5,940,880 A | 8/1999 | Phillips |
| 5,957,348 A | 9/1999 | Foreman |
| 6,000,395 A * | 12/1999 | Brown .................. 128/202.19 |
| 6,220,490 B1 | 4/2001 | O'Hara |
| 6,241,575 B1 * | 6/2001 | Shailer ........................ 450/38 |
| D444,295 S * | 7/2001 | Malik et al. .................. D3/224 |
| 6,422,439 B1 | 7/2002 | Kelliher et al. |
| 6,443,101 B1 * | 9/2002 | Fazio ......................... 119/792 |
| 6,581,811 B1 * | 6/2003 | Schillaci .................. 224/148.2 |
| 6,637,377 B2 * | 10/2003 | Lobanoff et al. ............ 119/792 |
| D539,009 S * | 3/2007 | Warn .......................... D2/861 |
| 2004/0088780 A1 | 5/2004 | Bachar |
| 2007/0012733 A1* | 1/2007 | Horito et al. .............. 224/148.2 |
| 2007/0085340 A1* | 4/2007 | Gammons ................... 285/308 |

FOREIGN PATENT DOCUMENTS

| WO | 0139620 A1 | 6/2001 |
|---|---|---|

* cited by examiner

WEARABLE DRINKING CONTAINER (HANDS FREE) X SHAPE

FIELD OF THE INVENTION

This hands-free wearable hydration unit solves the problem of having to inconveniently stop to get a bottle, glass, or cup of water while engaging in heavy or light activities; making it easy to drink during constant movement. Think of never having to stop to get a drink while on the go. No more huge or heavy back-packs, water helmets or huge bottle holders.

This is the easy and convenient portable water fountain on the go.

The second generation is the hands-free wearable oxygen unit. This unit solves the problem of having to lug around inconvenient huge oxygen tanks. This particular unit can be used in the Medical field for patients, including animals, who suffer from the lack of breathing, new-born or pre-mature babies, Space travel, Deep sea diving, Sports and recreation, and so many more uses that involve the need for additional oxygen.

SUMMARY OF THE INVENTION

Wearable drinking container (hands-free) "X" shape.

This particular container wraps around the chest and shoulder area, also around the back. It is light-weight, hands-free, and easily slips off and on in seconds for quick action. This container can be used during any type of sports activity and can be used for recreation purposes also.

The liquids that can be used in this container can range from cold water for long, strenuous activities in extreme heat temperatures, can also be filled with energy replenishing liquids, sports drinks, juice, or all sorts of drinks of choice. Also, when the weather is extremely cold, hot fluids such as soup can be used to drink to keep the body warm in extreme cold weather, with the insulation of the inner part of the container acting as a body warmer in the cold weather and a body cooler in the heated weather. This is a very useful and convenient drinking container, it will never be in the way and never too heavy.

The tubes that run through the vest, which I call the skeleton, is evenly balanced around the whole container and because it's in the shape of an "X" the weight of the water isn't in one area making it inconvenient and too heavy to lug around. The "X" shape, easily balances the water throughout the container for better flow and lighter with more water, feeling like less water. The tubes are flat and water flows through all at same time, bringing the water to one sipping tube and at the bottom has a draining tube, with small micro-holes for the air to allow the water to flow nicely.

This container can also be used to be filled up with air/oxygen. This would allow people who are having breathing problems to easily get around with oxygen instead of lugging around a huge oxygen tank; can be used for infants, people with breathing problems, football players and other sports players that could lose their wind from tough, hard-hitting activity, long-distance runners; scuba divers can just go right under water without something huge on their backs, of course it will be for shorter periods of time, but for those who just want to dive for short times, this device is perfect and convenient and can make scuba diving training a lot easier for instructors and those that want to learn. This oxygen container will of course come with extra oxygen cartridges for refilling and pumping air right into the tubes for easy access.

Both of these containers will also have various options. A few which are most important are:

1. Heart beat monitor with digital reading, calorie burning, timer, clock distance, etc.
2. Key holder
3. Money pouch
4. Cell phone pouch, water resistant material
5. Some "X" shape containers will have zippers and some will have Velcro straps also. These are more options to a wonderful innovative new creation.
6. Animals will be able to benefit from this new idea also, theirs would come with an attachment leash to squeeze liquid or oxygen into their mouths, since some animals can not sip on a tube.

Both of these hands-free wearable containers would be made with the latest and most durable materials to prevent any damages to the containers. The outer lining is made of heavy-duty, water-resistant, sweat-repellent mesh material. The inner lining which is very important in extreme hot and cold weather is made of very durable, heavy-duty, fully insulated material, to keep liquids warm or cold and to prevent the heat of the sun or cold of winter to change the temperature of the liquid and for the oxygen to prevent any heat or cold from stopping the oxygen flow.

All walks of life will benefit from this innovative new way of getting around easier with lightweight, hands-free liquids and oxygen. Disposable ones can be made for ambulance response calls, so that the patient can use the oxygen or water containers and if blood or germs get on the containers, it can be easily thrown away.

Heavy-Duty Uses: Non-Disposable

Hospitals, Olympics, extreme sports, scuba diving, floating life vest equipped with oxygen, water in case of ship wrecks at sea, Navy Seals, Army, military, air travel, SPACE travel, days just hanging out in a park, at the beach, touring; kids don't have to hold bottles of milk or water anymore; animals won't have to go without water when going for walks because these containers can be fitted to animals, too. Dogs will have an extension leash with a pouch at top of leash to squeeze water or oxygen for spare and since dogs can't sip on tubes. Other animals that can sip on tubes will benefit as well; animals at hospitals that need oxygen, or the little ones that need mild or just a little water. This is an important device that will help and advance all walks of life.

BRIEF DESCRIPTION OF THE DRAWINGS

FIG. 8. Example of man running with wearable container vest on.

DETAILED DESCRIPTION OF THE INVENTION

Figure 1:
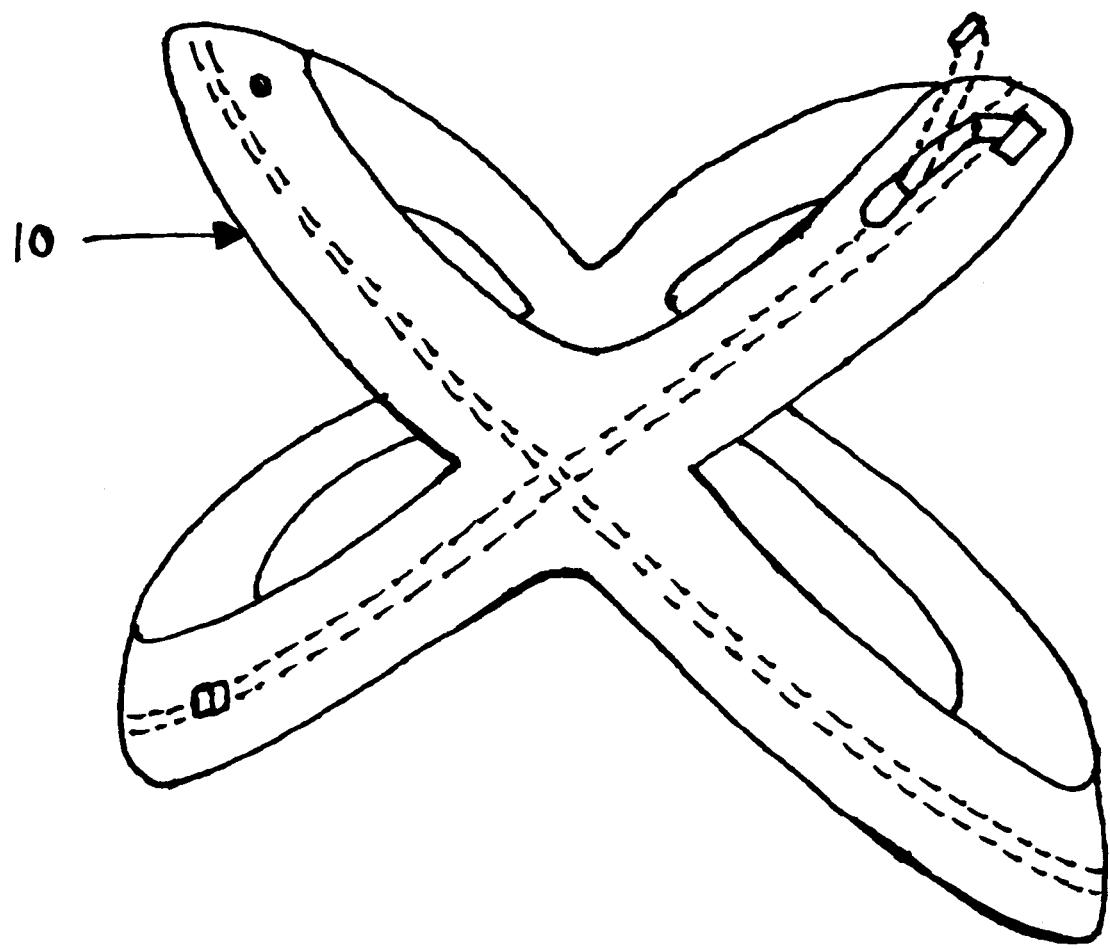
FIG. 1 is an orthogonal view of a garment according to the present invention.

FIG. 1 is an orthogonal view of a wearable vest 10 in shape of an "X". Can be put on over the head and slides down to wrap around that shoulder, chest and upper abdomen area.

Figure 2:
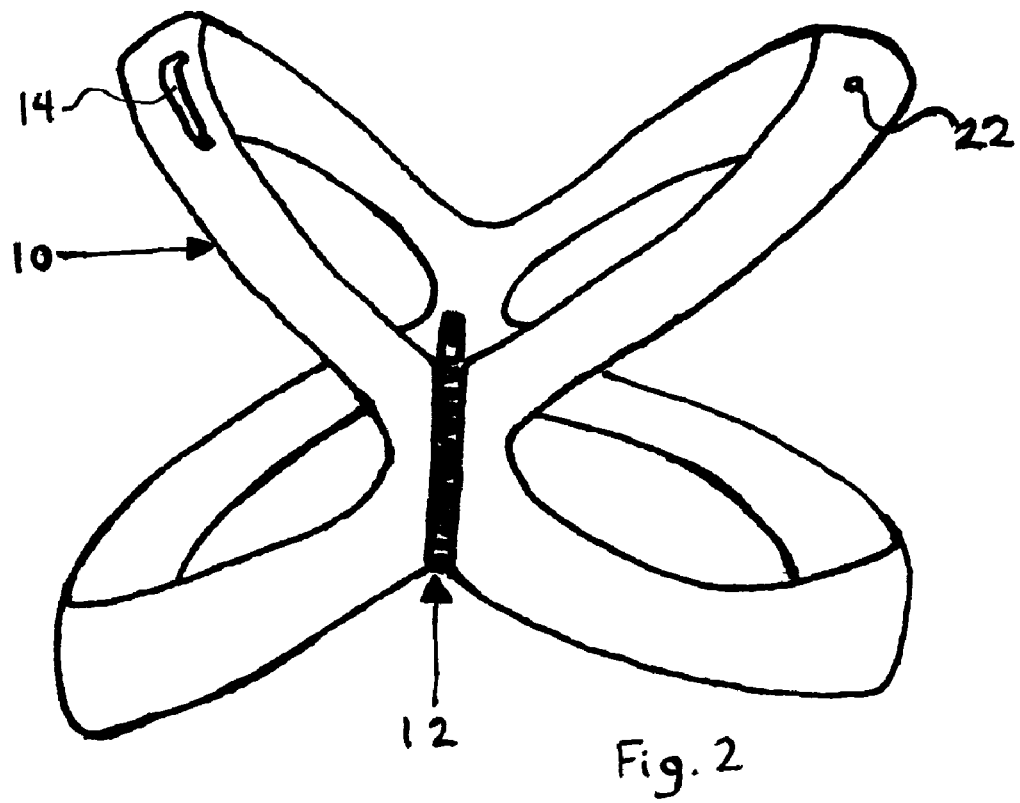
FIG. 2 is an embodiment of the present invention having a securing means secured.
Figure 2A:
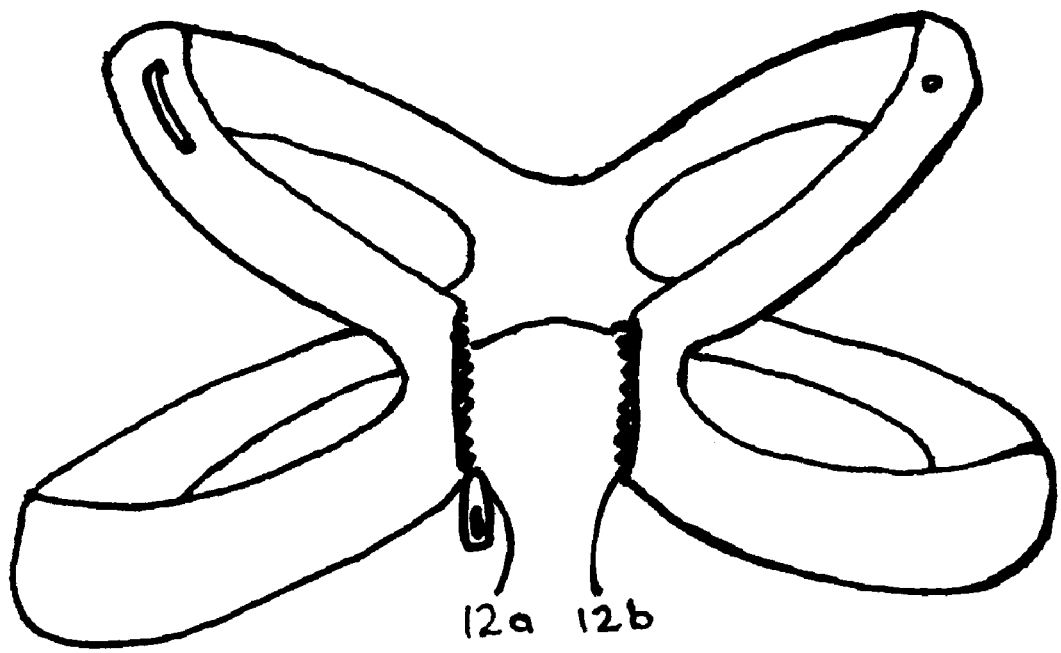
FIG. 2A is the embodiment of FIG. 2 with the securing means unsecured.

FIGS. 2 and 2A show a wearable vest 10 with a fastening means 12 for removably securing a separated X. Preferably, the fastening means is a zipper option or Velcro option 12, but can be snaps, buttons, or lacings.

Figure 3:
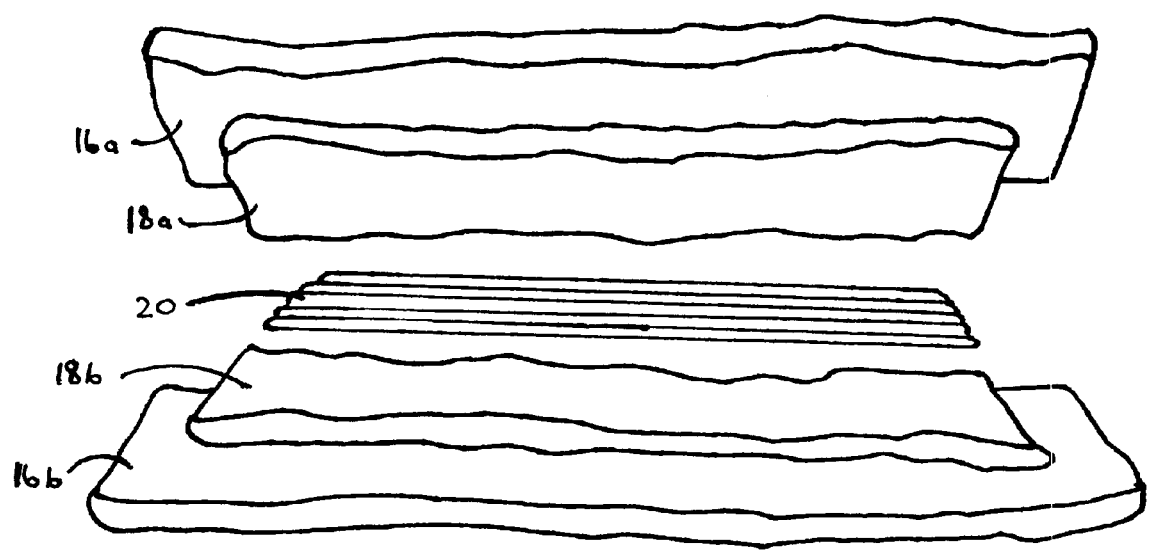
FIG. 3 is an exploded view of the layers of one embodiment of the present invention.
Figures 4, 4A, 4B:
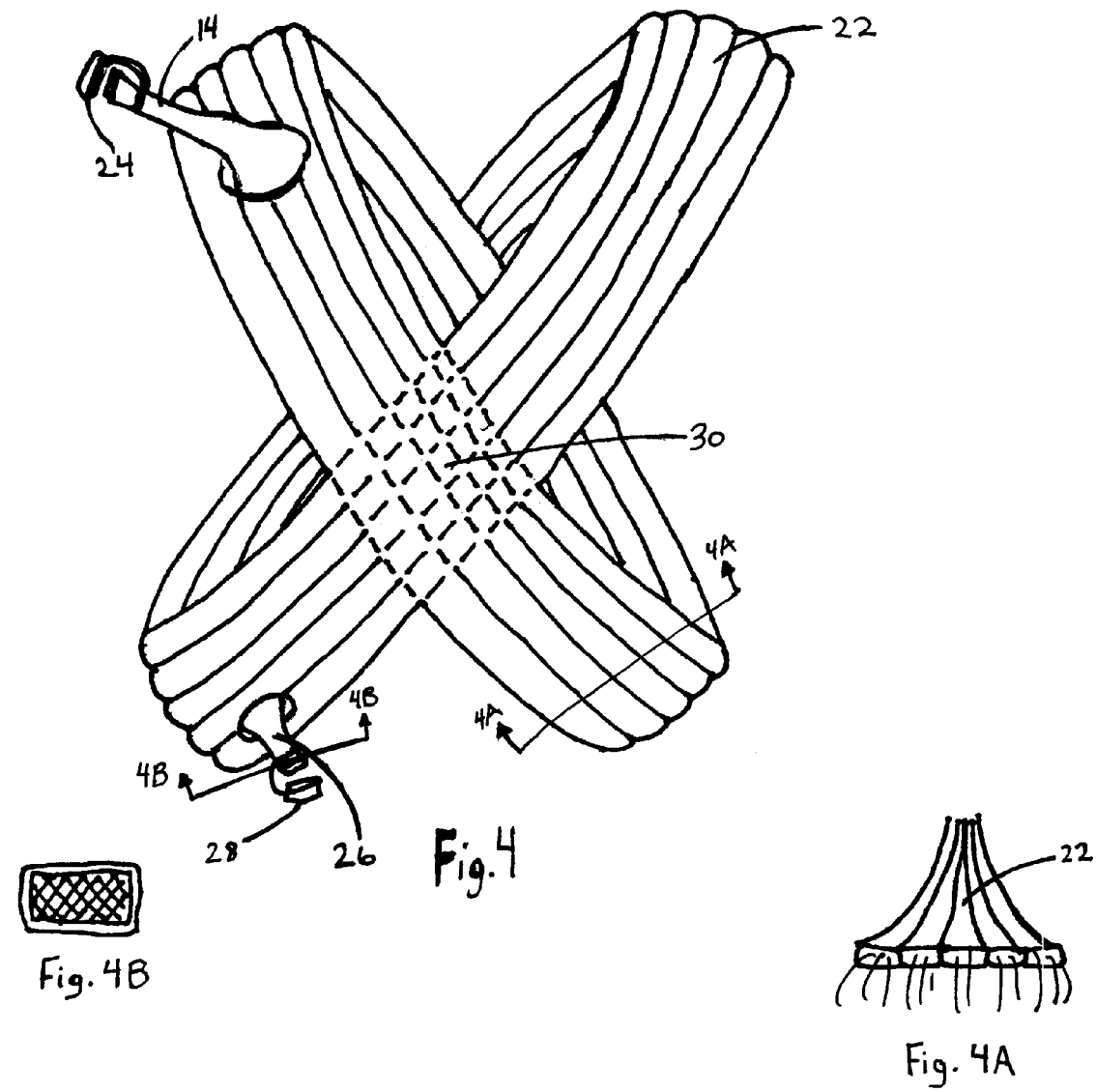
FIG. 4 is an orthogonal view of the Inner Tubing/Skeletal Interior.
FIG. 4A is a cross section of the tubing shown in FIG. 4.
FIG. 4B is a cross section of the drain shown in FIG. 4.
Figure 4C:
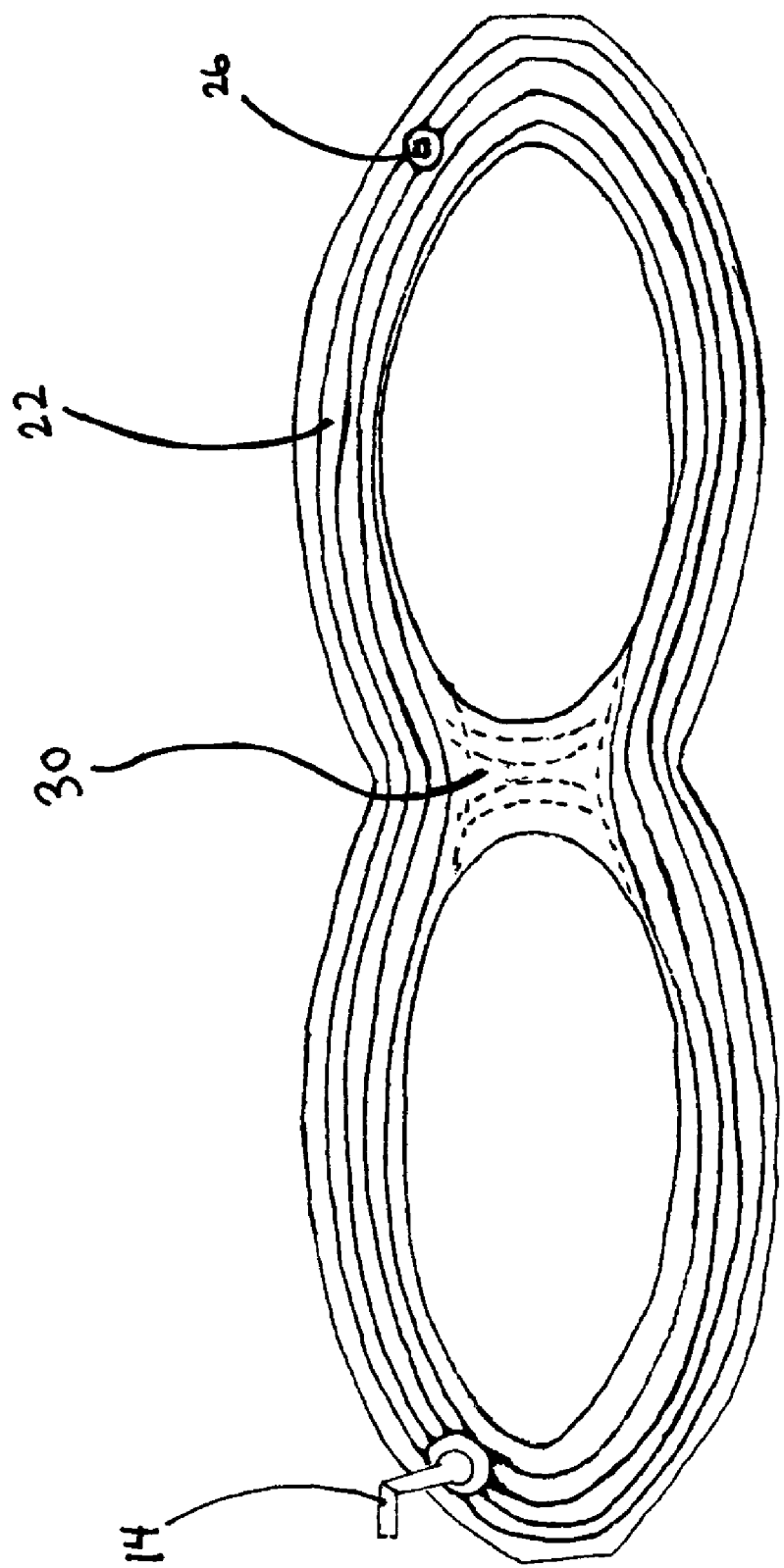
FIG. 4C is a layout of the garment showing the middle area open space.
Figure 5:
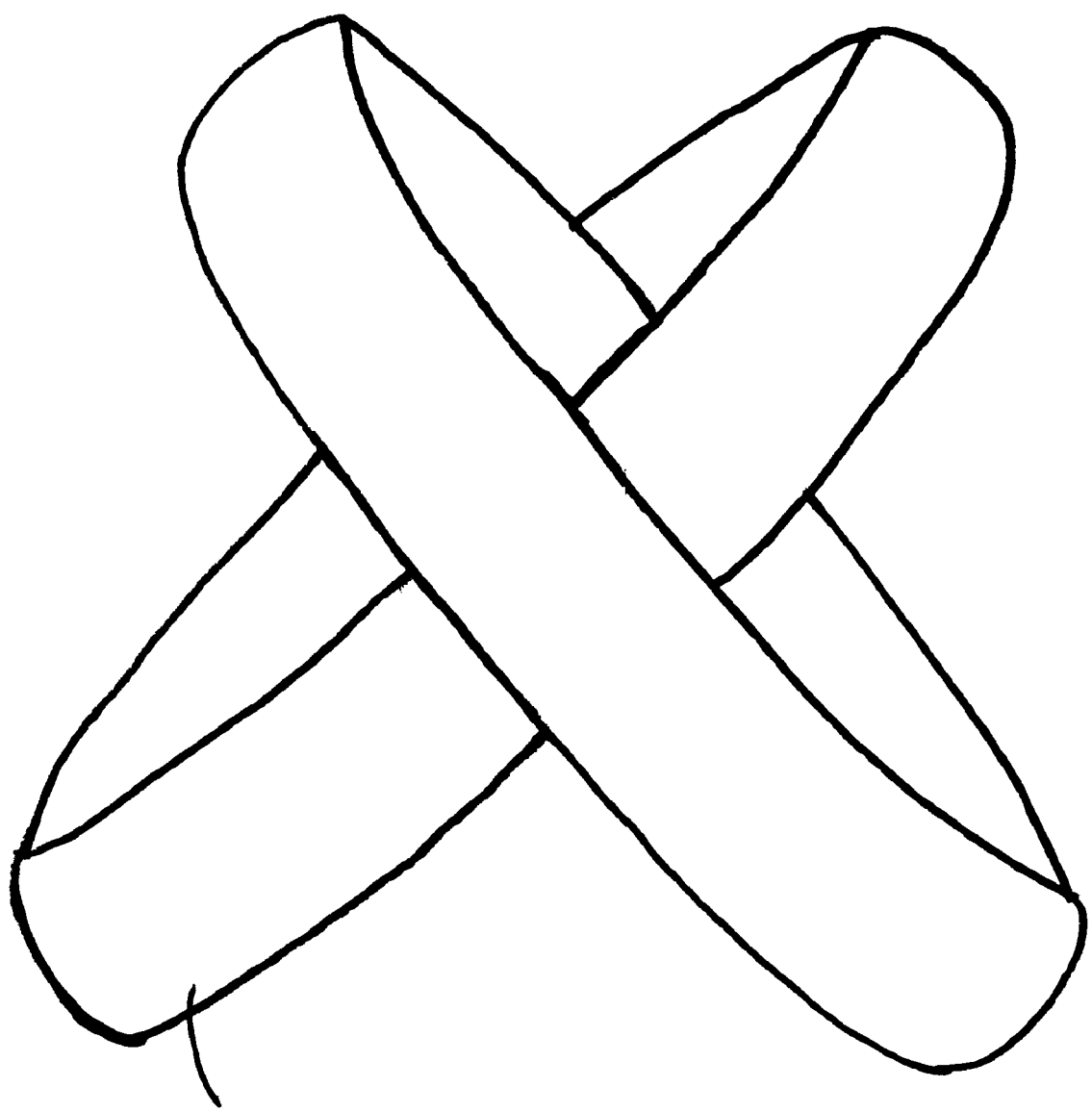
FIG. 5 is an orthogonal view of the fully insulated protective layer.
Figure 6:
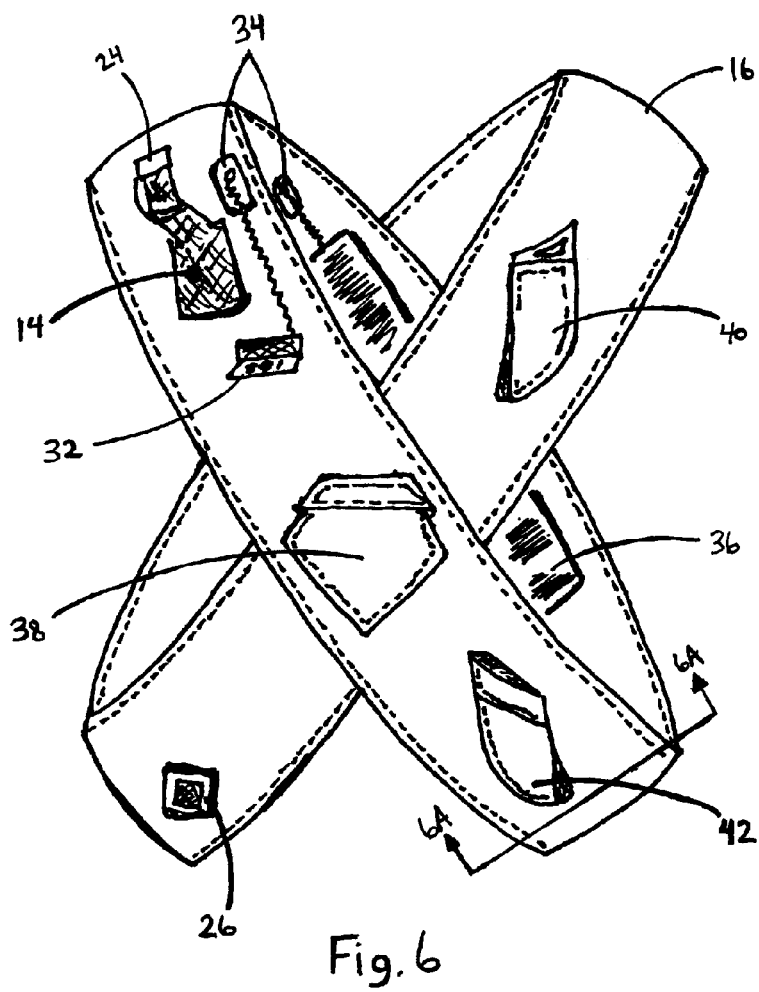
FIG. 6 is an orthogonal view of the Outer Mesh layer.
Figure 6A:
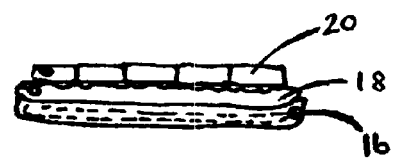
FIG. 6A is a cross section of the outer mesh layer shown in FIG. 6.
Figure 7:
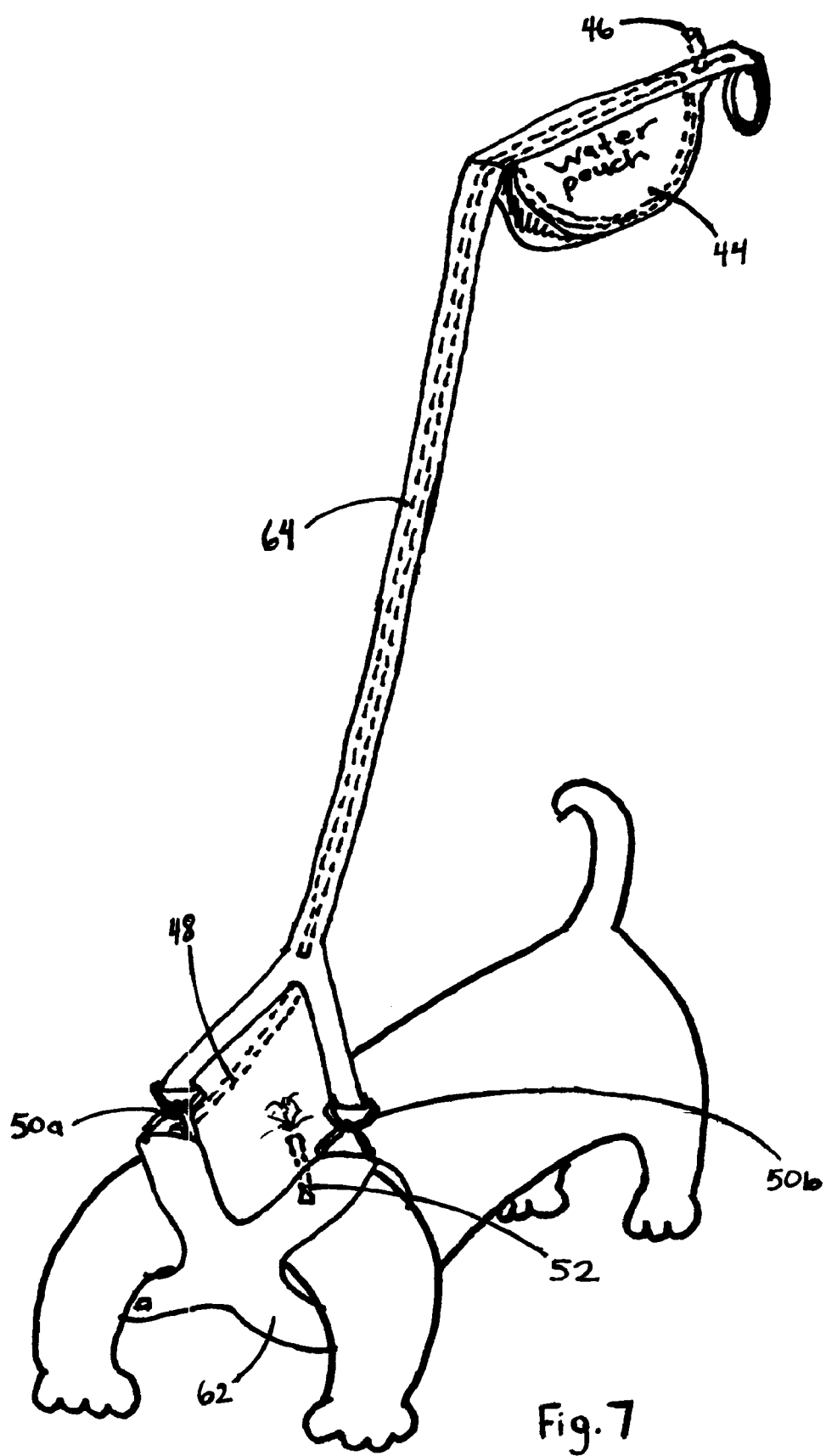
FIG. 7. Dog/Animal version of vest with Leash.
Figure 8:
Figures 9, 9A:
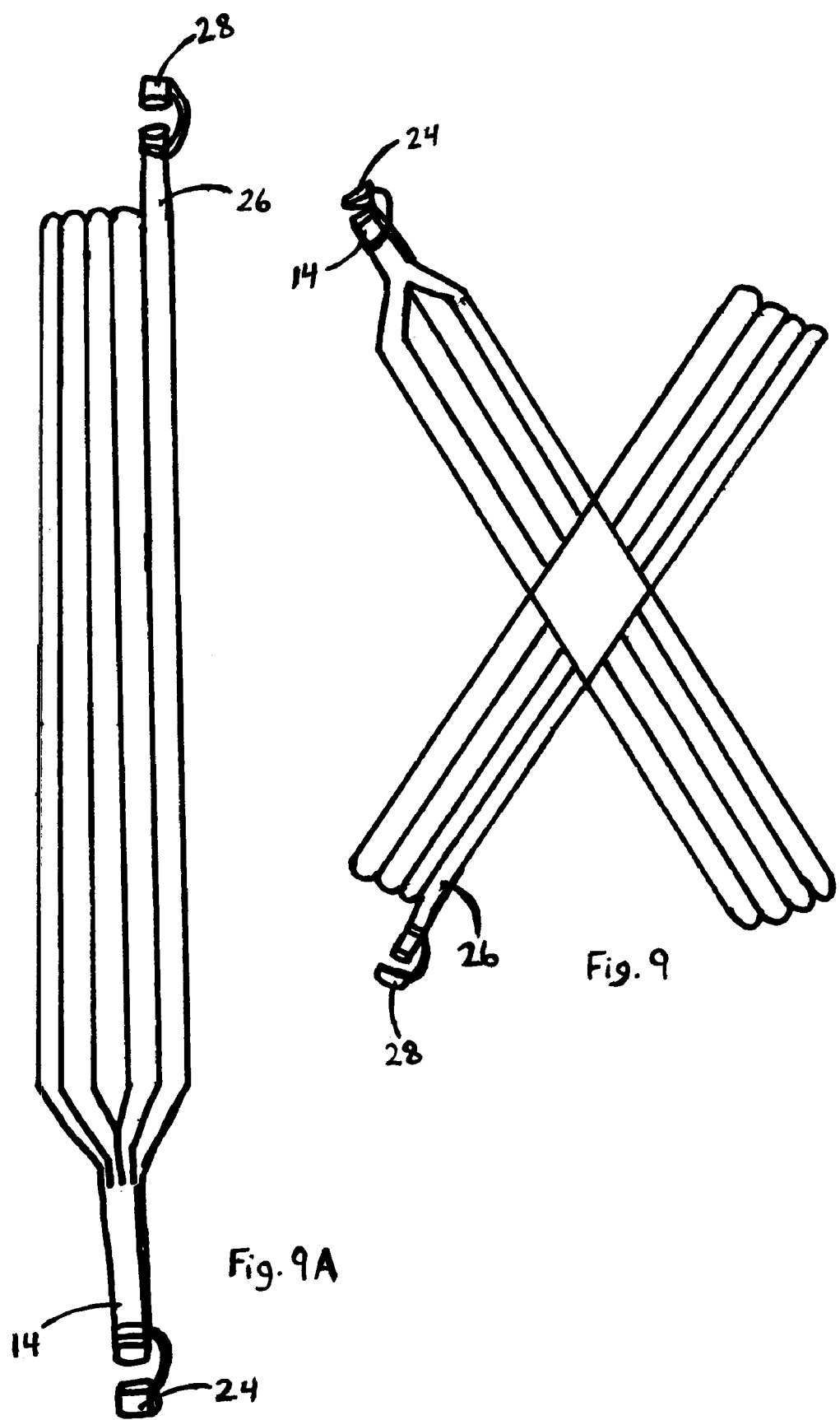
FIG. 9. Example of Inner Single Tubing
FIG. 9A. Example of Double Tubing
FIG. 10. Wearable Container—Refill Squeezable bottle.
Figure 10A:
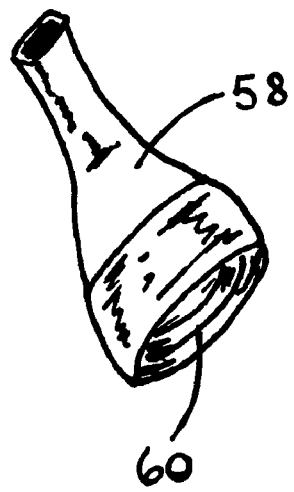
FIG. 10A. Wearable Container—Refill Plug in Bottle cap
Figure 10:
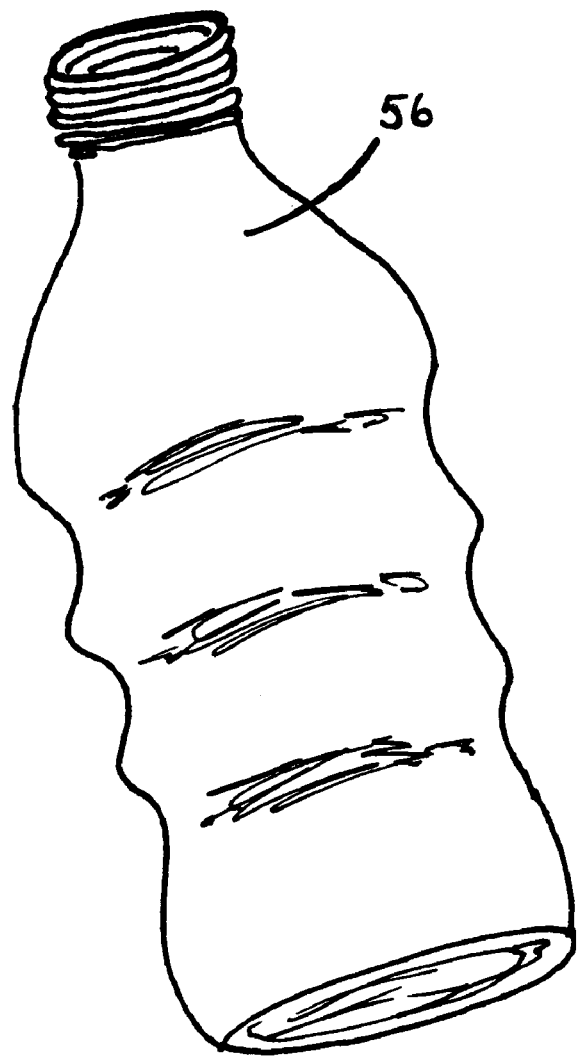

10. Quick zip, washable version. Zipped to wear
12a, 12b. Unzipped to take off easy. (optional) Velcro
14. Drink tube
22. Back tiny zipper to take inner tubing out, so outer can be washed; tubing can be filled at this time, also.
FIG. 3 Wearable components.
16a, 16b. Mesh material outer lining, stretchable, durable. Hands free
18a, 18b. Fully insulated inner layer, protecting, surrounding and insulating inner tubing to enable liquids to flow Hot, Warm or Cold
20. Easy flow tubing for drinking liquids hands free. (Drinking/Sipping at any pace).
FIGS. 4, 4A, 4B, and 4C. Inner Tubing/Skeletal Interior.
22. Thin flowing tubes, Flat to keep vest thin and compact (optional) round tubing. Easy flowing of liquids
14. Drink/Sip tube with no-leak cap 24, fill/refill liquids
26. Drain/airflow, no-leaks, one way valve 28.
30. Whole middle area, optional small opened space to store more liquids, or Tubes can run straight thru with free flow space for lightweight. (optional) Tubes can be sold separately from the rest of the vest in an X form or linear form, also for strapping over one arm of a wearer. The first and second set of flow tubes are separated through one X that does not have the open middle area 30, but are coupled by the middle area 30 so that fluid can flow between the tubes.
FIG. 5. Fully insulated protective layer 18. Insulates inner tubing/Skeletal Interior. Silver.
FIGS. 6 and 6a. Outer Mesh layer. Actual Vest/container. Housing Exterior
16. Outer Shell, made up of mesh material. All outer extras are for recreational uses. Competitive & Sport uses will come with standard heart monitor, clock and timers.
24. Drink/Sipper cap whole to slip thru.
26. Drain hole, airflow short stub tube, whole.
32. Digital reader for Heart/Pulse monitor—Universal timer clock.
34. Inner wire connecting heart monitor to digital reader
36. Heart beat/Pulse monitor, slips inside of inner tight fit pouch inside of outer vest.
38. Cell phone case/pouch
40. Money pouch
42. Key pouch/holder
20. Example of water flowing tubes, silver hot/cold insulation 18 and outer shell/housing 16. Also keeps upper body cool in the summer and cold in the winter. Can be put in freezer in summer.
FIG. 7. Dog/Animal version of vest with Leash
62. Dog/Animal vest
64. Leash with liquid tube or tubes running thru middle, transferring water thru leash
44. Extra water/fluid pouch, squeeze easy flow, used to push water thru leash to vest and into animals mouth, so that animal can drink while walking or running.
46. Refill tube
48. Water/liquid vest to leash attachment
50a, 50b. Leash to Vest attachment, metal triangle locks/unlocks leash to vest
52. Animal drinking tube, water/liquid flow pushed out by force of squeeze to pouch 44 through tube 64 through vest 62.
FIG. 8. Example of man 54 running with wearable container vest on.
10. Hands free wearable drinking container in shape of an "X"
14. Tube to go to mouth for drinking liquids while engaging in heavy or light activities.
FIGS. 9 and 9A. Examples of Inner Single Tubing in FIG. 9A and Double Tubing in FIG. 9.
14. Drinking/Sipping tube
26. Drain/Airflow tube
24, 28. No-Leak Caps.
FIGS. 10 and 10A. Wearable Container—Refill Plug in Bottle cap and Squeezable bottle.
56. Squeezable, refill bottle for extra, back up liquids.
58. Attachment refill plug cap, fits standard sized bottles/Rectangle shape tips for easy plug-in, to Wearable Container 10.
60. Standard size twist on cap to fit any sports of water, juice or liquid to refill Wearable Container 10 with liquids of choice.

What is claimed is:

1. A wearable fluid-containing garment comprising:
   a first set of flow tubes aligned adjacent to each other;
   a second set of flow tubes aligned adjacent to each other, wherein the second set of flow tubes cross the first set of flow tubes, thereby forming two X's, the second set of flow tubes operatively coupled with the first set of flow tubes by terminating at a free flow space at one X whereby fluids can enter and leave any tube;
   a drink tube operatively coupled with the first or second set of flow tubes for withdrawing fluid from the garment; and
   a drain tube operatively coupled with the first or second set of flow tubes for draining fluid from the garment.

2. The garment of claim 1, further comprising an inner lining of insulating material surrounding the first set of flow tubes and second set of flow tubes for maintaining the temperature of a fluid inside the flow tubes.

3. The garment of claim 2, further comprising an outer lining of water-resistant material surrounding the inner lining.

4. The garment of claim 3, wherein the outer lining water-resistant material is a mesh material.

5. The garment of claim 3, wherein the outer lining water-resistant material is a stretchable material.

6. The garment of claim 3, the outer lining further comprising a zippered opening sized to permit removal of the inner lining and flow tubes.

7. The garment of claim 3 further comprising a heart rate monitor sensor coupled with the outer lining.

8. The garment of claim 3 further comprising at least one pouch secured to the outer lining, whereby a wearer can carry a cell phone, money, or keys in the pouch.

9. The garment of claim 1, wherein the first and second set of flow tubes are separated through one X instead of terminating in a free flow space.

10. The garment of claim 9 further comprising a fastening means for removably securing the separated X.

11. The garment of claim 10, wherein the fastening means is a zipper, a hook and loop fastener, snaps, buttons, or lacing.

12. The garment of claim 1 further comprising a center fluid pouch operatively coupled to the first or second set of tubes.

13. The garment of claim 1 further comprising a no leak cap coupled with the drink tube.

14. The garment of claim 1 further comprising a no leak, one way valve coupled with the drain tube.

15. The garment of claim 1 further comprising:
- a leash having at least one fluid tube operatively coupled with the first or second set of flow tubes; and
- a fluid pouch operatively coupled with the leash fluid tube for transferring fluid from the fluid pouch through the leash fluid tube to the first or second set of flow tubes.

16. The garment of claim 15 further comprising a refill tube operatively coupled with the fluid pouch.

17. The garment of claim 1 further comprising a refill plug cap comprising:
- a threaded twist cap corresponding to an opening on a fluid bottle; and
- a fitting corresponding to the drinking tube or drain tube for filling flow tubes with the contents of the fluid bottle.

18. The garment of claim 17, further comprising a fluid bottle having a threaded opening corresponding to the threaded twist cap.

19. The garment of claim 1, further comprising a fluid disposed within flow tubes.

20. The garment of claim 19, wherein the fluid is one of water, sports drink, juice, soup, oxygen, and air.

* * * * *